Figure 3:
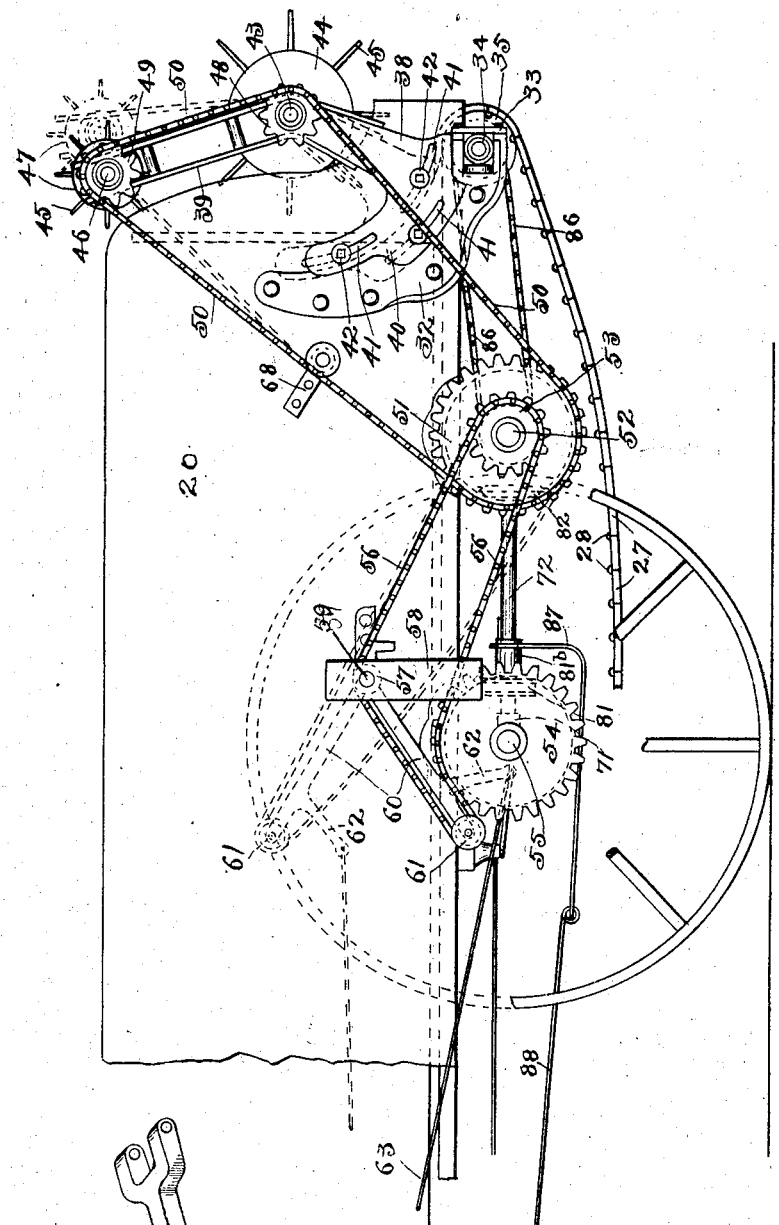

No. 790,583. PATENTED MAY 23, 1905.
A. F. MANNING,
MANURE SPREADER.
APPLICATION FILED JULY 18, 1904.
5 SHEETS—SHEET 1.
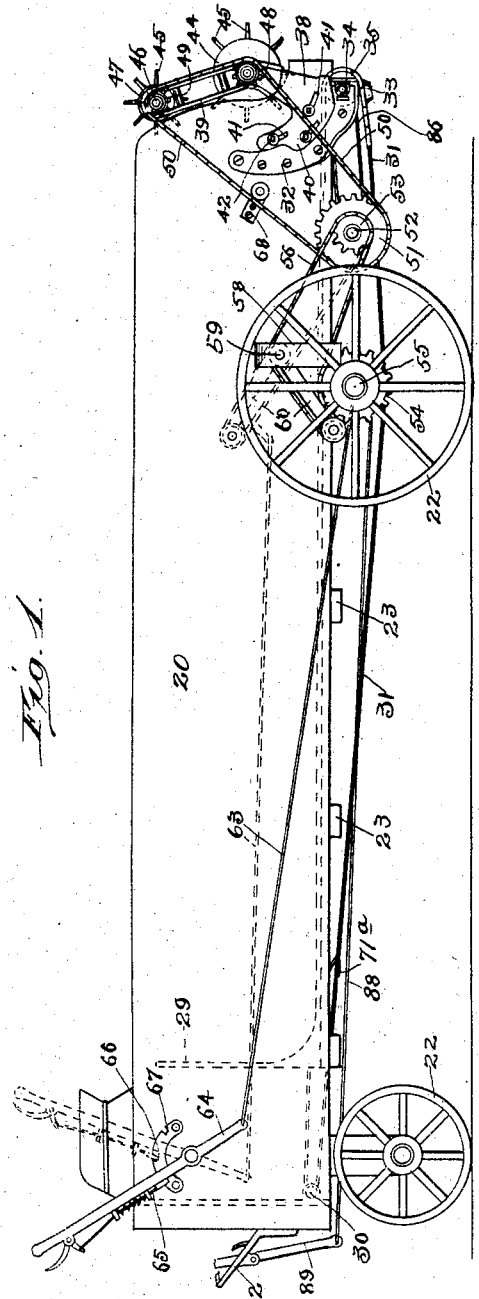
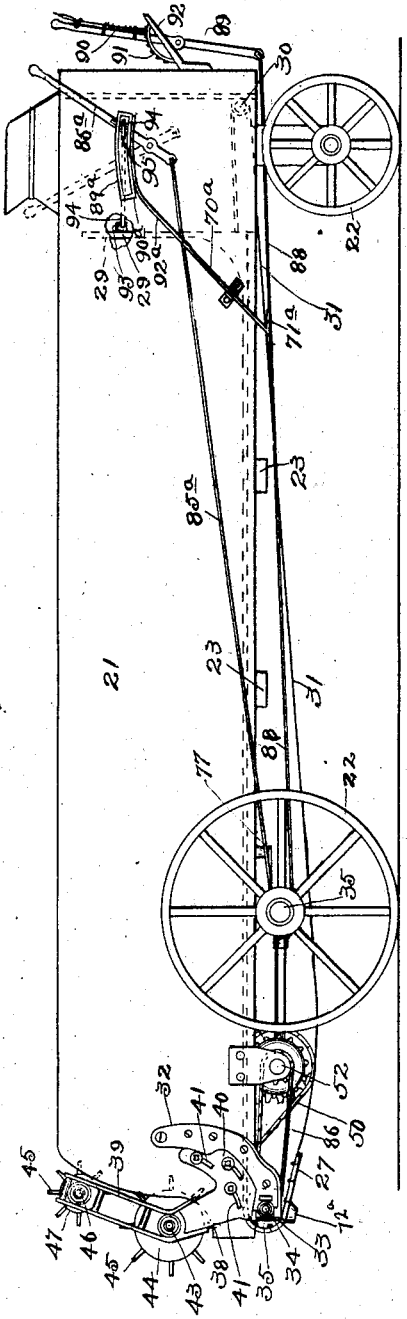
Witnesses:
Chas. E. Gorton
A. Gustafson
Inventor:
Aquilla F. Manning
By Chas. C. Tillman
Atty.

No. 790,583. PATENTED MAY 23, 1905.
A. F. MANNING.
MANURE SPREADER.
APPLICATION FILED JULY 18, 1904.

5 SHEETS—SHEET 2.

Witnesses:
Chas. E. Gorton
A. Gustafson

Inventor:
Aquilla F. Manning
By Chas. A. Tillman
Att'y.

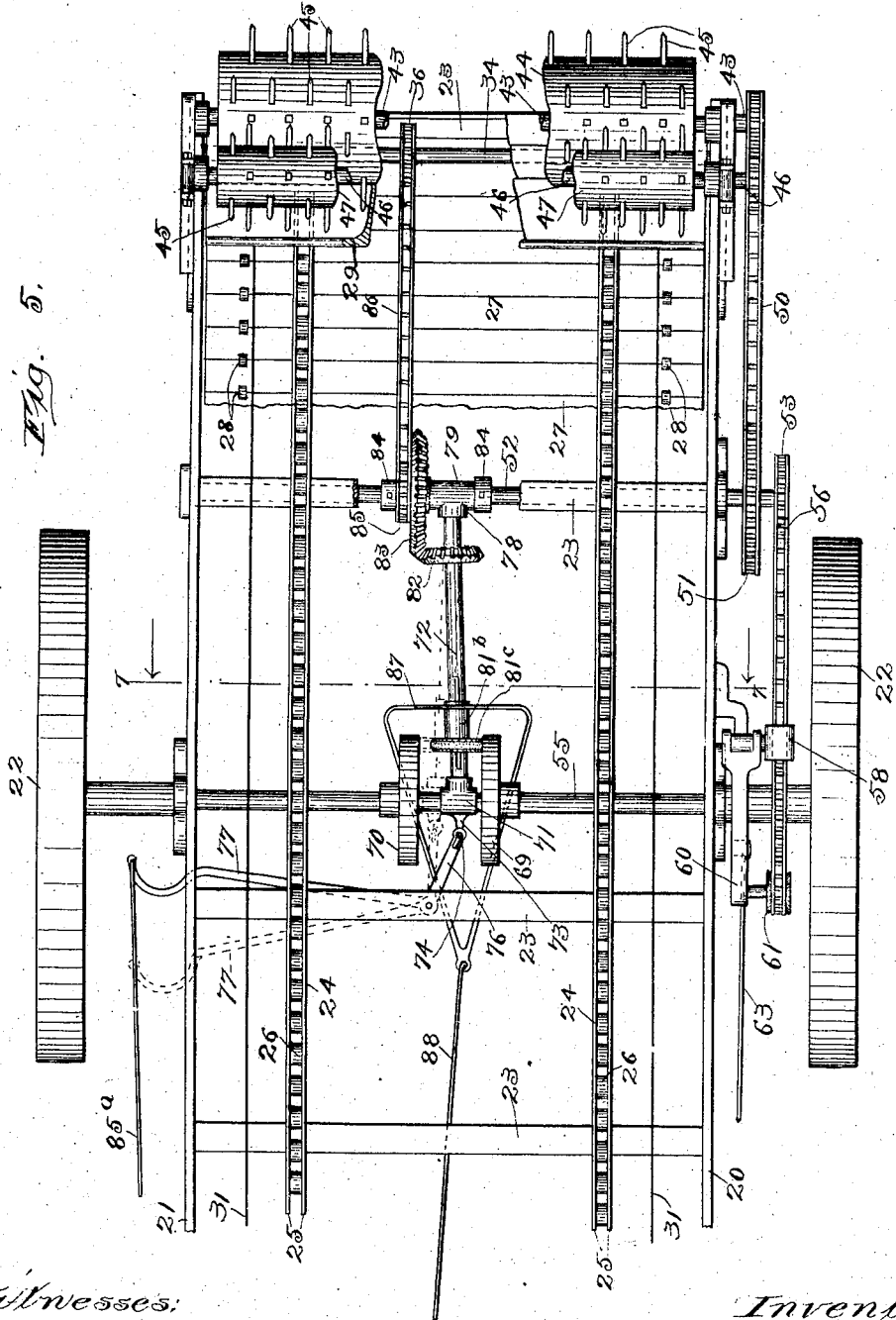

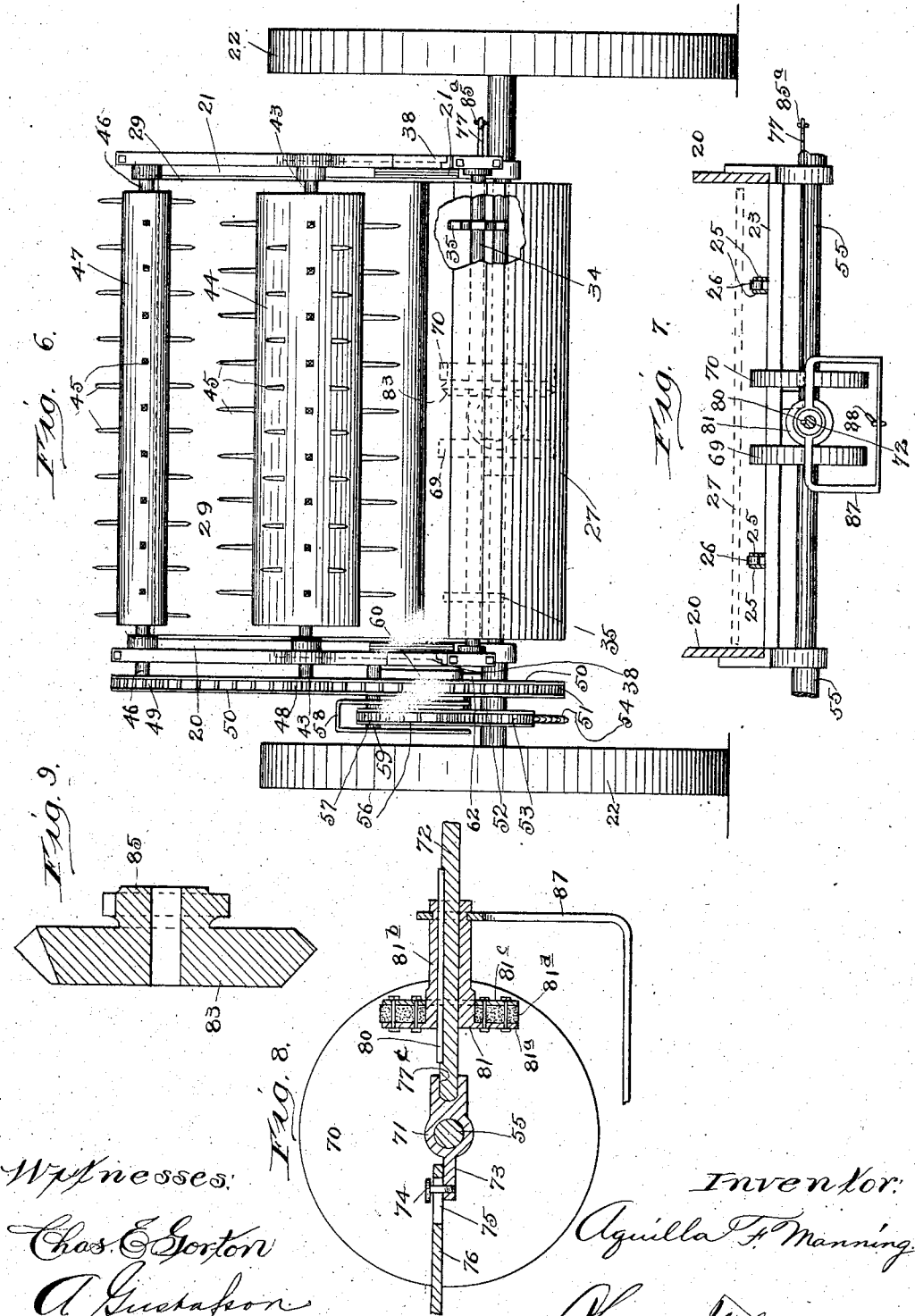

No. 790,583. PATENTED MAY 23, 1905.
A. F. MANNING.
MANURE SPREADER.
APPLICATION FILED JULY 18, 1904.
5 SHEETS—SHEET 5.
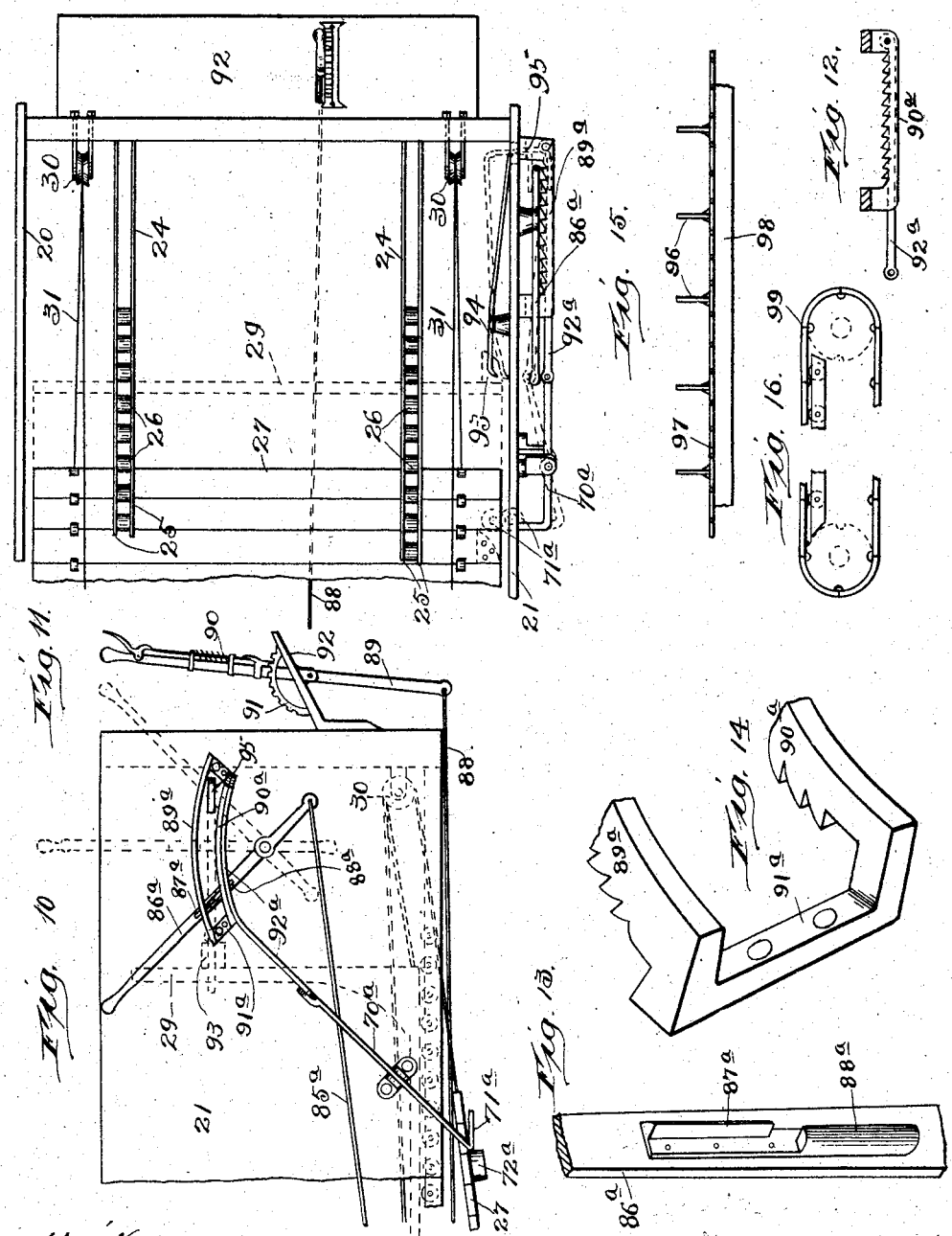

No. 790,583. Patented May 23, 1905.

UNITED STATES PATENT OFFICE.

AQUILLA F. MANNING, OF CHICAGO, ILLINOIS.

MANURE-SPREADER.

SPECIFICATION forming part of Letters Patent No. 790,583, dated May 23, 1905.

Application filed July 18, 1904. Serial No. 217,018.

*To all whom it may concern:*

Be it known that I, AQUILLA F. MANNING, a subject of the King of England, residing at Chicago, in the county of Cook and State of Illinois, have invented certain new and useful Improvements in Manure-Spreaders, of which the following is a specification.

This invention relates to improvements in an apparatus for spreading or distributing manure, compost, and the various kinds of fertilizers used for enriching land, and pertains especially to that type of such machines in which a box-like body is mounted on the ordinary running-gear of a wagon and has in its bottom a reciprocating conveyer which gradually carries the material to the rear end of the body, from which end it is cast and distributed by means of a pair of rotary cylinders having teeth to engage, break up, or pulverize the material; and the invention consists in an improved construction and organization of the various parts whereby the same is rendered more efficient and more convenient in its operation, as will be hereinafter more fully set forth and specifically claimed.

The principal object of the invention is to furnish a manure-spreader which shall be comparatively simple and inexpensive in construction, strong, durable, and so made that the manure or other suitable fertilizing material may be readily and evenly distributed over a field.

Another object is to provide means for automatically returning the conveyer to its initial position, or that position it will occupy when receiving the load or when transporting it to the field, as soon as the load has been distributed and for controlling the movement of the conveyer, so as to regulate the rate of feed or distribution.

Still another object is to furnish means for breaking up, shredding, or properly reducing the fertilizing material before it is distributed.

A further object is to provide means for throwing the driving mechanism which actuates the conveyer, as well as that which drives the distributing-cylinders, into and out of gear at the will of the operator.

Other objects and advantages of the invention will be disclosed in the subjoined description and explanation.

While the essential and characteristic features of the invention are susceptible of modification, still the preferred embodiment of the invention is illustrated in the accompanying drawings, in which—

Figure 4:
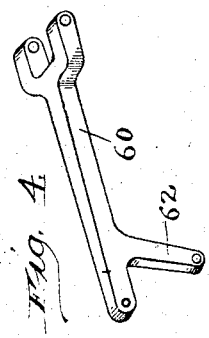

Figure 1 is a view in elevation of one side of a manure-spreader embodying my invention, showing the gearing for operating the distributing-cylinders and illustrating the hand-lever and its connection for throwing the mechanism into and out of gear. Fig. 2 is a similar view of the opposite side of the machine, showing the hand-lever and its connections for operating and releasing the conveyer-operating mechanism. Fig. 3 is an enlarged view in elevation of the rear portion of the machine, showing the mechanism for operating, as well as adjusting, the distributing-cylinders and illustrating by dotted lines the positions the parts will occupy when the mechanism is thrown out of gear and also the position to which the auxiliary distributing-cylinder may be moved. Fig. 4 is a detached perspective view of a gear-shifting arm used for throwing the mechanism into and out of gear. Fig. 5 is a fragmental plan view of the rear portion of the machine, showing the mechanism for operating the conveyer, as well as for driving the distributing-cylinders. Fig. 6 is a rear end view of the machine, showing a portion of the conveyer broken away to disclose a part of the mechanism used for operating the same. Fig. 7 is a view, partly in section and partly in elevation, taken on line 7 7 of Fig. 5 looking in the direction indicated by the arrows and showing the mechanism for operating the conveyer. Fig. 8 is a view, partly in elevation and partly in section, of a portion of the mechanism used for operating the conveyer. Fig. 9 is a central sectional view of a combined gear and sprocket wheel used in driving the conveyer mechanism. Fig. 10 is a view in elevation of the front portion of the box-body, showing a part of the conveyer in act of releasing the hand-lever which controls the operating mechanism for the conveyer. Fig. 11 is a plan view thereof. Fig. 12 is a detached fragmental view of a portion of the rack-bar with which said hand-lever engages. Fig. 13 is a perspective view of a portion of said lever. Fig. 14 is a similar view of a portion of the rack-bar therefor. Figs. 15 and 16 are detail views showing modifications in the construction of the conveyer.

Like numerals of reference refer to corresponding parts throughout the different views of the drawings.

The reference-numerals 20 and 21 represent the sides of the bed or body, which may be of the ordinary box-like construction and is mounted on the running-gear 22 of a wagon, which may be of the ordinary type, but in which the rear wheels are employed for imparting power to the actuating mechanism of the machine. The bottom of the box-body is preferably left open and is provided with a series of transverse bars 23, which secure the sides together at their bottom edges and serve to brace them, as well as to support the track-rails 24, each of which comprises two parallel bars 25, between which are journaled a series of antifriction-rollers 26, on which the lower surface of the load-supporting portion of the conveyer will rest and travel. As is clearly shown in Fig. 5 of the drawings, the track-rails 24 are located parallel with one another and extend longitudinally from one end of the bottom of the body to the other. The conveyer comprises a series of slats 27, which are secured together near each of their ends by means of hinges 28, which are located on the lower surface of said slats when the conveyer is in its initial position and project slightly from the slats, so as to form engaging means for the purpose to be presently explained. By reference to Fig. 5 of the drawings it will be understood that the slats of the conveyer are located transversely in the body, so as to form a bottom therefor when the conveyer is in its initial position. The front part of the conveyer is provided with an upright end-gate 29, which extends transversely across the body between its sides and is normally located about the front end thereof, but is carried rearwardly by the conveyer. Journaled on the lower portion of the front end of the body near the sides 20 and 21 are sheaves or pulleys 30, over which are passed cables 31, which are secured at one of their ends to the rear end of the conveyer and at their other ends to the front end thereof, or that portion which supports the end-gate. Secured to the outer surface of each of the sides of the body near its rear end is a bracket 32, which, as shown, is forwardly curved and has its lower end projecting below the lower edges of the sides to form journal-boxes 33 or bearings for the transverse shaft 34, on which is mounted near each of its ends a sprocket-wheel 35, which engage the hinges 28, which connect the slats of the conveyer. Rigidly mounted on the shaft 34 between the sprocket-wheels 35 is another sprocket-wheel, 36, used for advancing and retracting the conveyer.

Adjustably secured to the rear end of each side of the box-body is a hanger 38, which is provided with an upwardly and forwardly extending arm 39 and has its lower portion enlarged and curved to form an extension 40, which overlaps the rear curved portion of the bracket 32 and is provided with a number of slots 41 to receive bolts 42, used for securing it to the body in such a manner that the position of the arm 39 may be shifted, as is shown by dotted lines in Fig. 3 of the drawings. By thus curving the brackets and providing the hangers with curved extensions to overlap the curved portions of the brackets it is apparent that the hangers will be guided and somewhat braced thereby. Journaled transversely at the rear end of the body and near the middle portion of the upwardly-extending arms 39 of the hangers 38 is a shaft 43, on which is fixed the main distributing-cylinder 44, which is provided with a series of radial spikes or teeth 45 of any desired length and material. Horizontally and transversely journaled on the upper portion of the arms 39 is a shaft 46, on which is rigidly mounted an auxiliary distributing-cylinder 47, which is provided with a series of radial teeth 45 of any suitable length. Mounted on one end of the shaft 43 is a sprocket wheel or pinion 48, and on the corresponding end of the shaft 46 is mounted a sprocket wheel or pinion 49, over both of which passes a sprocket-chain 50, which also passes over a sprocket-wheel 51, mounted on a transverse shaft 52, which is suitably journaled on the lower portion of the rear part of the body. Mounted on the shaft 52 outwardly from the wheel 51 is a sprocket-wheel 53, which is geared to the main driving sprocket-wheel 54 on the rear axle or driving-shaft 55 by means of a sprocket-chain 56, which passes over an idler 57, journaled in a guide-bracket 58, secured to the side of the body near the rear axle. On the shaft 59, on which the idler 57 is mounted, is secured the forked end of an arm 60, which has journaled on its free end an idler 61, over which the chain 56 also passes. The arm 60 is provided near its free end with a downward projection 62, to which one end of a rod 63 is pivotally secured, the other end of which is similarly attached to the lower end of a hand-lever 64, which is fulcrumed on the front portion of the side 20 of the body and is provided with a spring-actuated grip-rod 65 to engage recesses 66 in a segmental catch 67 therefor, secured to the front portion of the body. By releasing the grip-rod 65 from the catch 66 and throwing the lever 64 to the position indicated by dotted lines in Fig. 1 of the drawings it is apparent that the swinging arm 60 will thereby be raised to the position indicated by dotted lines in Fig. 3, thus throwing the operating mechanism for the distributing-cylinders out of gear. It is also apparent that by reversing the movement of the lever 64 the swinging arm 60 will be lowered so that the sprocket-chain 56 will engage the sprocket-wheel 54, thus throwing the said mechanism into gear. Suitably secured to the side 20 of the body is a chain-tightener 68 of the ordinary construction used for taking up the slack in the chain 50, which drives the distributing-cylinders.

Rigidly mounted on the rear axle 55 near its middle and at a slight distance apart are two main friction-disks 69 and 70, between which is movably mounted on the axle 55 a journal-box 71 for one end of a shaft 72 used for driving and changing the direction of movement as well as the speed of the conveyer. The movable or slidable box 71 is provided on its front portion with an extension 73, which has a pin 74 to fit in a slot 75 of the shorter arm 76 of a bell-crank lever 77 used for the purpose to be presently explained. The rear portion of the box 71 is formed with a socket or bearing $77^c$, in which the front end of the shifting shaft 72 is loosely fitted. The rear end of this shaft is loosely fitted in a bearing 78 on the front portion of a journal-box 79, loosely mounted on the transverse shaft 52. (See Fig. 5 of the drawings.) Slidably mounted on the front portion of the shifting shaft 72, but prevented from rotating thereon by means of a spline or feather 80 on said shaft, is an auxiliary or shifting friction-disk 81, which preferably comprises a disk $81^a$, having integral therewith a hub $81^b$, and another disk, $81^c$, bolted to the first-named disk.

Interposed between the disks $81^a$ and $81^c$ is a disk $81^d$, of fiber or other suitable material, used to increase the friction between the shifting disk and the main disks. Rigidly mounted on the rear portion of the shaft 72 is a beveled gear 82, which meshes with a similar gear 83, loosely mounted on the shaft 52 at one side of the journal-box 79, which journal-box, as well as the gear 83, is prevented longitudinal movement on the shaft 52 by means of collars 84, fixed on said shaft. The gear 83 is provided on its face opposite the box 79 with a sprocket-wheel 85, over which passes a sprocket-chain 86, which also passes over the sprocket-wheel 36 on the shaft 34 at the rear of the body, which shaft, as before stated, carries the sprocket-wheels 35, which engage the hinges 28 of the conveyer, and thereby advance or retract the same. Fixed to the rear portion of the hub $81^b$ of the shifting disk 81 is a yoke 87, which depends below and extends forwardly under the main disks 69 and 70 and has loosely connected to its front portion a rod 88, the other end of which projects slightly in front of the front end of the body and is pivotally connected to the lower end of a hand-lever 89, which is provided with a spring-actuated grip 90 to engage a quadrant 91, mounted on the footboard 92, through a suitable opening in which said lever extends upwardly. By releasing the grip 90 from the quadrant 91 and throwing the lever 89 toward the body it is evident the shifting disk 81 will through its connections with said lever be moved forwardly on its shaft, thereby reducing the speed of the conveyer, and consequently the rate of feed will be diminished. By throwing said lever in the opposite direction the speed of the conveyer will be augmented and the rate of feed increased.

The longer arm 77 of the bell-crank lever, which is fulcrumed on a suitable support on the bottom of the body in front of the friction-disks, extends slightly beyond the side 21 of the body and has pivotally secured thereto at one of its ends a rod $85^a$, which is similarly connected at its other end to a hand-lever $86^a$, fulcrumed on the front portion of the side 21 of the body. This hand-lever is provided on its outer surface with two oppositely-beveled projections $87^a$ and $88^a$ to engage, respectively, the teeth on the upper and lower members $89^a$ and $90^a$ of a double segmental rack $91^a$. (See Figs. 2, 10, 11, 13, and 14 of the drawings.) As shown, the teeth on the upper member are forwardly inclined, while those on the lower one are oppositely inclined, so that when the lever $86^a$ is in the position shown by continuous lines in Fig. 2 the projection $87^a$ will engage the first-named teeth and when in the position shown by dotted lines in Fig. 2 and full lines in Fig. 10 will engage the last-named teeth. Pivotally secured at one of its ends near the front end of the segment $91^a$ is a rod $92^a$, which has its other end pivotally connected to an outer tripping-lever $70^a$, which is fulcrumed on the lower front portion of the body and has its lower end inturned and rounded, as at $71^a$, so as to project under the body and occupy the position to be struck by the rear end of the conveyer or a projection $72^a$ thereon, which projection has its surface adjacent to the projecting portion $71^a$ of said lever beveled or rounded, as shown in Fig. 10, to force the lower end of the lever outwardly, which operation will cause the rod $92^a$ to be pressed toward the side of the body, thus releasing the projection $88^a$ on the hand-lever $86^a$ from the teeth on the lower bar of the segment $91^a$, when said lever may be thrown to the position shown by dotted lines in Fig. 10, thus drawing the longer arm 77 of the bell-crank lever rearwardly, and thereby moving the shifting disk from contact with the disk 70 and into impingement with the disk 69, as shown by full lines in Fig. 5, which operation will reverse the movement of the shaft 72 and cause the conveyer to advance to its initial position. Just before it reaches its initial position a beveled projection 93 on the front surface of the end-gate 29 will strike the inner end of an inner tripping-lever 94, which is fulcrumed on the inner surface of the side 21 and extends through an opening therein, and force said end outwardly, thus moving the outer end inwardly, and thereby release the projection 87ª on the hand-lever 86ª from the teeth on the upper member of the rack 91ª, when said lever may again be thrown rearward to reverse the movement of the conveyer.

The outer portion of the lever 94 is bent back upon itself, as at 95, so as to detachably engage the hand-lever and to draw it toward the side 21 of the body.
While I have shown and above described a reciprocating conveyer formed of abutting slats operating in a bottomless body and prefer to use such a construction, yet I may, without departing from the spirit of the invention, employ a conveyer composed of transverse pieces 96 and connected together near their ends by chains 97 to draw said pieces over the bottom 98 of the body (see Fig. 15) or may use an endless conveyer 99, like that shown in Fig. 16 of the drawings, which also can be reciprocated.

The operation of the machine is simple and as follows: When it is desired to load the box-body, the conveyer is located in the lower portion thereof in such a manner that the end-gate 29 will be at or near the front end of the body, in which position the conveyer will form a movable bottom. When in this position, the friction-disks on the rear axle and the shifting disk are out of engagement, and the mechanism for driving the distributing-cylinders may be thrown out of gear by throwing the hand-lever 64 from the position shown in continuous lines of Fig. 1 to that illustrated by dotted lines in said figure, in which operation the swinging arm 60, which carries the sprocket-chain 56, will be raised to the position indicated by dotted lines in Fig. 3 of the drawings, thus permitting the machine to be driven to the field or to the place where it is desired to distribute the manure without actuating any of the parts except the running-gear. To distribute the fertilizing material, the hand-lever 64 is thrown from the position indicated by dotted lines in Fig. 1 to that shown by continuous lines in said figure, which operation will lower the swinging arm 60 and throw the operating mechanism for the distributing-cylinders into gear. It will be understood that in transporting the load to the field the lever 86ª, which controls the operating mechanism for the conveyer, will occupy the position shown by vertical dotted lines in Fig. 10 of the drawings, and when the point of distribution is reached the said lever should be thrown to the position indicated by continuous lines in said figure, which operation will move the bell-crank lever 77 to the position shown by dotted lines in Fig. 5, thus throwing the shifting disk 81 into engagement or contact with the disk 70, so that the sprocket-wheels 35, engaging the projecting hinges 28, will drive the conveyer rearwardly, thus feeding the manure to the distributing-cylinders, by means of which it will be broken up and scattered evenly over the ground. As the conveyer travels thus rearwardly the front portion thereof or the projection 72ª thereon will strike the lower end 71ª of the lever 70ª and cause its upper end to be pressed toward the side 21 of the body, in which operation the rod 92ª will be caused to press the hand-lever 86ª out of engagement with the teeth of the ratcheted segment 90ª, when the same may be thrown to the position shown by dotted lines in Fig. 10, thereby through the connecting-rod 85ª throwing the lever 77 to the position indicated by full lines in Fig. 5 of the drawings. In the foregoing operation the members 81 and 70 will be thrown out of contact and the member 81 be thrown into contact with the disk 69, thus reversing the movement of the conveyer. By moving the hand-lever 89 on the foot-board in the proper direction it is apparent that the position of the shifting disk 81, through its connections with said lever, may be regulated with respect to the main disks 69 and 70, so as to increase or diminish the rate of speed of the conveyer, and thereby the rate of feed, for it is obvious that when the disk 81 is slid on the shaft 72 toward the axle 55 the rotation of said shaft will be lessened and the movement of the conveyer correspondingly decreased. By shifting said disk outwardly from the axle 55 the rotation of the shaft 72 will be increased and the movement of the conveyer correspondingly augmented.

If the fertilizing material is in lumps or contains straw, stalks, or other material which it is desired to be broken up before it is deposited on the ground, it is evident that as the distributing-cylinders 44 and 47 rotate in the same direction the main cylinder 44 will carry the material upwardly over the same, in which operation the teeth or spikes of the auxiliary cylinder will engage the material sufficiently to retard its progress, so that the teeth of the two cylinders will cause it to be properly reduced. When the manure or fertilizer is in lumps or held together by straw or hay, it is evident that these lumps as they are presented to the main distributing-cylinder will be lifted by the teeth thereof, and if the auxiliary cylinder is located in front and above the main cylinder, as shown by continuous lines in Fig. 3 of the drawings, it will retard the delivery of the manure to such an extent that it might clog or block the cylinders, and it is for this purpose that the auxiliary cylinder is journaled on the adjustable brackets 38 so that its position with respect to the rear end of the body and the end-gate 29 as it approaches said end may be shifted rearwardly, as shown by dotted lines in the last-named figure. If the manure is in a pulverulent condition, it may be advisable to adjust the auxiliary cylinder so that it will lie slightly in front of the main cylinder or directly over the same.

Having thus fully described my invention, what I claim as new, and desire to secure by Letters Patent, is—

1. In a manure-spreader, the combination with the body, of a reciprocating conveyer at its bottom, a hanger located on each side of the body and having on its lower portion an extension provided with slots, each of said hangers having an upwardly-extending arm, securing-bolts located in said slots, and a main and an auxiliary cylinder journaled on said hangers, substantially as described.

2. In a manure-spreader, the combination with the body, a curved bracket secured to the rear portion of each side of the body, a hanger having on its lower portion a curved extension provided with slots and overlapping the curved portion of each of the brackets, each of said hangers having an upwardly-extending arm, securing-bolts located in the said slots, and a main and an auxiliary distributing-cylinder journaled on said arms, substantially as described.

3. In a manure-spreader, the combination with the body, of a conveyer at its bottom, a curved bracket secured to the rear portion of each side of the body and having its lower end projecting below the lower edge of the side of the body and formed with a journal-box, a hanger having on its lower portion a curved extension provided with slots and overlapping the curved portion of each of the brackets, each of said hangers having an upwardly-extending frame, securing-bolts located in the said slots, a main and auxiliary distributing-cylinder journaled on said arms, and a transverse shaft located in the journal-boxes of the brackets, substantially as described.

4. In a manure-spreader, the combination with the body, of a shaft transversely journaled at the rear end thereof, a flexible conveyer located at the bottom of the body, means on said shaft to operatively engage the conveyer, two members mounted on the rear axle at a distance apart, a shifting member movably mounted between the first-named members and operatively connected to said transverse shaft, means to throw the shifting member into contact with either one or out of contact with both of the first-named members, and means to advance or retract the shifting member so as to regulate the speed of the conveyer in either direction of its travel, substantially as described.

5. In a manure-spreader, the combination with the body, of a shaft transversely journaled at the rear end thereof, a sprocket-wheel mounted on said shaft near each of its ends, a flexible conveyer located in the bottom of the body and having means to engage said sprocket-wheels, two friction-disks mounted on the rear axle at a distance apart, a shifting disk movably mounted between the first-named disks and geared to said transverse shaft, and means to throw the shifting disk into contact with either one or out of contact with both of the friction-disks, whereby the movement of the conveyer may be reversed or its driving mechanism thrown out of gear, substantially as described.

6. In a manure-spreader, the combination with the body, of a shaft transversely journaled at the rear end thereof, a sprocket-wheel mounted on said shaft near each of its ends, a flexible conveyer located in the bottom of the body and having means to engage said sprocket-wheels, two friction-disks mounted on the rear axle at a distance apart, a shifting disk movably mounted between the first-named disks and geared to said transverse shaft, and means to move the shifting disk toward and from the rear axle between the friction-disks, whereby the speed of the conveyer may be regulated, substantially as described.

7. In a manure-spreader, the combination with the body, of a shaft transversely journaled at the rear end thereof, a sprocket-wheel mounted on said shaft near each of its ends, a flexible conveyer located at the bottom of the body and having means to engage said sprocket-wheels, two friction-disks mounted on the rear axle at a distance apart, a shifting disk movably mounted between the first-named disks and geared to said transverse shaft, means to throw the shifting disk into contact with either one or out of contact with both of the friction-disks, and means to move the shifting disk toward and from the rear axle between the friction-disks, substantially as described.

8. In a manure-spreader, the combination with the body, of a shaft transversely journaled at the rear end thereof, a sprocket-wheel mounted on said shaft near each of its ends, another sprocket-wheel mounted on said shaft intermediate of the first-named sprocket-wheels, a conveyer located at the bottom of the body and having means to engage the first-named sprocket-wheels, two friction-disks mounted on the rear axle at a distance apart, another shaft transversely journaled on the body between the rear axle and first-named shaft, a beveled gear loosely mounted on the intermediate shaft and geared to the said intermediate sprocket-wheel, a shifting shaft longitudinally mounted with its front end between the friction-disks, a shifting disk slidably mounted on the front portion of the shifting shaft, a beveled gear rigidly mounted on the rear portion of the shifting shaft to mesh with the first-named gear, and means to throw the shifting disk into contact with either one or out of contact with both of the friction-disks, whereby the movement of the conveyer may be reversed or its driving mechanism thrown out of gear, substantially as described.

9. In a manure-spreader, the combination with the body, of a shaft transversely journaled at the rear end thereof, a sprocket-wheel mounted on said shaft near each of its ends, another sprocket-wheel mounted on said shaft intermediate of the first-named sprocket-wheels, a conveyer located at the bottom of the body and having means to engage the first-named sprocket-wheels, two friction-disks mounted on the rear axle at a distance apart, another shaft transversely journaled on the body between the rear axle and first-named shaft, a beveled gear loosely mounted on the intermediate shaft and geared to the said intermediate sprocket-wheel, a shifting shaft longitudinally mounted with its front end between the friction-disks, a shifting disk slidably mounted on the front portion of the shifting shaft, a beveled gear rigidly mounted on the rear portion of the shifting shaft to mesh with the first-named gear, means to throw the shifting disk into contact with either one or out of contact with both of the friction-disks, and means to move the shifting disk toward and from the rear axle between the friction-disks, substantially as described.

10. In a manure-spreader, the combination with the body, of a shaft transversely journaled near the rear end thereof, a conveyer located at the bottom of the body, means on said shaft to engage the conveyer, two friction-disks mounted on the rear axle at a distance apart, another shaft transversely journaled on the body between the rear axle and first-named shaft, a beveled gear loosely mounted on the intermediate shaft and geared to the rear transverse shaft, a shifting shaft loosely mounted at its ends on the rear axle and intermediate shaft, a shifting disk slidably mounted on the front portion of the shifting shaft between the friction-disks, a beveled gear rigidly mounted on the rear portion of the shifting shaft to mesh with the first-named gear, and means to throw the shifting disk into contact with either one or out of contact with both of the friction-disks, substantially as described.

11. In a manure-spreader, the combination with the body, of a shaft transversely journaled near the rear end thereof, a conveyer located at the bottom of the body, means on said shaft to engage the conveyer, two friction-disks mounted on the rear axle at a distance apart, another shaft transversely journaled on the body between the rear axle and first-named shaft, a beveled gear loosely mounted on the intermediate shaft and geared to the rear transverse shaft, a shifting shaft loosely mounted at its ends on the rear axle and intermediate shaft, a shifting disk slidably mounted on the front portion of the shifting shaft between the friction-disks, a beveled gear rigidly mounted on the rear portion of the shifting shaft to mesh with the first-named gear, means to throw the shifting disk into contact with either one or out of contact with both of the friction-disks, and means to move the shifting disk toward and from the rear axle between the friction-disks, substantially as described.

12. In a manure-spreader, the combination with the body, of a shaft transversely journaled near the rear end thereof, a conveyer located at the bottom of the body, means on said shaft to engage the conveyer, two friction-disks mounted on the rear axle at a distance apart, another shaft transversely journaled on the body between the rear axle and the first-named shaft, a beveled gear loosely mounted on the intermediate shaft and geared to the rear transverse shaft, a journal-box loosely mounted on the rear axle between the friction-disks, another journal-box loosely mounted on the intermediate transverse shaft, a shifting shaft having its ends loosely mounted in said journal-boxes, a shifting disk mounted on the front portion of the shifting shaft, a beveled gear rigidly mounted on the rear portion of the shifting shaft to mesh with the first-named gear, and means to throw the shifting disk into contact with either one or out of contact with both of the friction-disks, substantially as described.

13. In a manure-spreader, the combination with the body, of a shaft transversely journaled near the rear end thereof, a conveyer located at the bottom of the body, means on said shaft to engage the conveyer, two friction-disks mounted on the rear axle at a distance apart, another shaft transversely journaled on the body between the rear axle and the first-named shaft, a beveled gear loosely mounted on the intermediate shaft and geared to the rear transverse shaft, a journal-box loosely mounted on the rear axle between the friction-disks, another journal-box loosely mounted on the intermediate transverse shaft, a shifting shaft having its ends loosely mounted in said journal-boxes, a shifting disk slidably mounted on the front portion of the shifting shaft, a beveled gear rigidly mounted on the rear portion of the shifting shaft to mesh with the first-named gear, means to throw the shifting disk into contact with either one or out of contact with both of the friction-disks, and means to move the shifting disk toward and from the rear axle between the friction-disks, substantially as described.

14. In a manure-spreader, the combination with the body, of a shaft transversely journaled near the rear end thereof, a conveyer located at the bottom of the body, means on said shaft to engage the conveyer, two friction-disks mounted on the rear axle at a distance apart, another shaft transversely journaled on the body between the rear axle and first-named shaft, a beveled gear loosely mounted on the intermediate shaft and geared to the rear transverse shaft, a shifting shaft loosely mounted at its ends on the rear axle and intermediate shaft, a shifting disk mounted on the front portion of the shifting shaft between the friction-disks, a beveled gear rigidly mounted on the rear portion of the shifting shaft to mesh with the first-named gear, a hand-lever fulcrumed on the front portion of the body, connections uniting the lower end of said lever and the front portion of the shifting shaft, a rack-bar secured to the front portion of the body near said lever, a rod pivotally secured at one of its ends near said lever, an outer tripping-lever fulcrumed on the body and connected at one of its ends to the lower end of said rod and having its other end extending into the path of the conveyer, substantially as described.

15. In a manure-spreader, the combination with the body, of a shaft transversely journaled near the rear end thereof, a conveyer located at the bottom of the body, means on said shaft to engage the conveyer, two friction-disks mounted on the rear axle at a distance apart, another shaft transversely journaled on the body between the rear axle and first-named shaft, a beveled gear loosely mounted on the intermediate shaft and geared to the rear transverse shaft, a shifting shaft loosely mounted at its ends on the rear axle and intermediate shaft, a shifting disk mounted on the front portion of the shifting shaft between the friction-disks, a beveled gear rigidly mounted on the rear portion of the shifting shaft to mesh with the first-named gear, a hand-lever fulcrumed on the front portion of the body, connections uniting the lower end of said lever and the front portion of the shifting shaft, a double rack-bar secured to the front portion of the body near said lever and having two rows of oppositely-inclined teeth, a rod pivotally secured at one of its ends near said lever, an outer tripping-lever fulcrumed on the outer surface of the body and connected at one of its ends to the lower end of said rod and having its other end extending into the path of the conveyer, and an inner tripping-lever fulcrumed on the inner surface of the body and having its rear end projecting into the path of the end-gate on the conveyer and its front end adapted to detachably engage said hand-lever, substantially as described.

16. In a manure-spreader, the combination with the body, of a conveyer located at its bottom, a mechanism for reciprocating the conveyer, a hand-lever fulcrumed on the front portion of the body, connections uniting the lower end of said lever and a portion of the mechanism for driving the conveyer whereby said mechanism may be thrown into and out of gear and the movement of the conveyer reversed, a double rack-bar secured to the front portion of the body near the hand-lever, a rod pivotally secured at one of its ends near said lever, an outer tripping-lever fulcrumed on the body and connected at one of its ends to the lower end of said rod and having its other end extending into the path of the conveyer, and an inner tripping-lever fulcrumed on the inner surface of the side of the body and having its rear end projecting into the path of the end-gate on the conveyer and its outer end adapted to detachably engage said hand-lever, substantially as described.

17. In a manure-spreader, the combination with the body, of a conveyer located at its bottom, a mechanism for driving the conveyer, a device for controlling the operation of the driving mechanism for the conveyer, consisting of a hand-lever fulcrumed to the front portion of the body, a rod connected at one of its ends to the lower end of said lever and united at its other end to a portion of said driving mechanism, a rack-bar secured to the front portion of the body near said lever, a rod pivotally secured at one of its ends near said lever, an outer tripping-lever fulcrumed on the body and connected at one of its ends to the lower end of said rod and having its other end extending into the path of the conveyer, substantially as described.

18. In a manure-spreader, the combination with the body, of a conveyer located at its bottom, a mechanism for driving the conveyer, a device for controlling the operation of the driving mechanism for the conveyer, consisting of a hand-lever fulcrumed to the front portion of the body, a rod connected at one of its ends to the lower end of said lever and united at its other end to a portion of said driving mechanism, a rack-bar secured to the front portion of the body near said lever and having two rows of oppositely-inclined teeth, a rod pivotally connected at one of its ends to the rack-bar, an outer tripping-lever fulcrumed on the body and connected at one of its ends to the lower end of said rod and having its other end extending into the path of the conveyer, and an inner tripping-lever fulcrumed to the inner surface of the side of the body and having its rear end projecting into the path of the end-gate on the conveyer and its outer end adapted to detachably engage the hand-lever, substantially as described.

19. In a manure-spreader, the combination with the body, of a reciprocatory conveyer at its bottom, a mechanism for advancing and retracting said conveyer, a hand-lever fulcrumed to the front portion of the body, connections uniting the lower end of said lever and a portion of said driving mechanism, a rack-bar secured to the front portion of the body near said lever, a rod pivotally secured at one of its ends near said lever, an outer tripping-lever fulcrumed on the body and connected at one of its ends to the lower end of said rod and having its other end extending into the path of the conveyer, substantially as described.

AQUILLA F. MANNING.

Witnesses:
CHAS. C. TILLMAN,
A. GUSTAFSON.